3,516,961
POLYAMIDE COMPOSITIONS
Howard E. Robb, Henderson, Ky., assignor to Gulf
  Oil Corporation, Pittsburgh, Pa., a corporation of
  Pennsylvania
No Drawing. Continuation-in-part of application Ser. No.
  413,319, Nov. 23, 1964. This application June 1, 1966,
  Ser. No. 554,355
    Int. Cl. C08f 1/84, 45/04; C08k 1/02
U.S. Cl. 260—41                                5 Claims

ABSTRACT OF THE DISCLOSURE

Homogeneous mixtures of fillers and polyamide resins are obtained by contacting the polyamide resins with a concentrate comprising a lactam, a filler and an ethylene copolymer.

---

This is a continuation-in-part application of application Ser. No. 413,319 by H. E. Robb filed Nov. 23, 1964, now U.S. Pat. 3,375,219.

This invention relates to polyamide compositions and methods of preparation In another aspect, this invention relates to compositions comprising homogeneous mixtures of fillers and polyamide resins of the nylon type.

The addition of fillers or of pigments, such as carbon black, to polyamide resins, of the nylon type, for pigmentation and/or for stabilization is well known in the art. Heretofore, the addition of such fillers was effected by their mechanical blending in the polyamides. However, in addition to the difficulty in mechanically obtaining a uniform homogeneous dispersion of the filler in the resin, the inclusion of such fillers in the polyamides resulted in compositions which were not only difficult to work but which were very brittle and difficult to fabricate by conventional procedures. For example, in the case of mechanically blending 2 percent carbon black in the resin for improved light stability, a very brittle polymer results. As a result, the carbon black is added in practice during polymerization in order to obtain good physical properties in the polymer. Not only is this not a satisfactory method from an economic standpoint, but, in addition, presents a very obvious problem in clean-up.

Application Ser. No. 413,319 discloses a process for the uniform dispersion in polycarbonamide base resins finely divided pigments by means of a compatible carrier resin which neither reacts with nor detracts from the properties of the polycarbonamide to any substantial extent. However, it has been discovered, in accordance with this invention, that the tensile and elongation properties of the polycarbonamide resins produced by the process described in application Ser. No. 413,319 are substantially improved if the finely divided filler material or pigment is contacted with a lactam prior to incorporation of the carrier resin and filler mixture into the polycarbonamide resin.

Accordingly, it is an object of my invention to provide novel compositions of polyamide resins having fillers dispersed uniformly therein.

It is another object of my invention to provide an improved process for incorporating fillers in polyamide resins of the nylon type.

It is also an object of my invention to provide an improved process for dispersing fillers in polyamide resins.

A further object of my invention is to provide an improved process for preparing polyamide resins containing fillers which are easily compounded, shaped and fabricated into ductal and non-brittle products.

A still further object of my invention is to provide compositions of polyamide resins having improved tensile strength and elongation.

Other objects, advantages and features of my invention will be readily apparent to those skilled in the art from the following description and appended claims.

By polycarbonamides are meant and intended commercial nylon and polyamide resins having recurring amide groups as integral parts of a molecular chain structure characterized by amide links and hydrocarbon links along the chain. Typical of these polycarbonamides is the product commercially known as Nylon 6 which is obtained by the polymerization of caprolactam. Another typical polycarbonamide is that obtained by the condensation of a dibasic organic acid (e.g. adipic and sebacic) and a diamine (e.g. hexamethylene diamine). A further illustrative polycarbonamide is the copolymer of an amino acid or the lactam thereof (e.g. caprolactam), a dibasic organic acid (e.g. isophthalic acid) and a diamine (e.g. m-xylylene diamine). In general, these polycarbonamides will have a molecular weight in excess of 20,000.

The filler for incorporation into the polycarbonamide can be any of the conventional pigments and coloring agents and loading agents normally employed with the resin, either for decorative (coloring) effect, for stabilization against ultraviolet degradation or for loading of the polymer. Typical of such fillers are carbon black, magnesium silicate, iron filings, asbestos fibers, glass fibers, ground glass, various metallic bronze powders, such as aluminum, gold or copper bronze, titanium dioxide, iron blue, chrome green and the like. The particle sizes of these fillers are not critical, and they may be subdivided to the particle sizes required for the desired application of the resin. For example, the carbon blacks (forming a preferred embodiment of this invention) either of the channel or furnace black variety and having a particle size of from about 50 to about 350 angstroms are suitable for use in invention. A particularly preferred particle size for the carbon black is of the order of 50 to 200 angstroms.

The carrier resin for the filler is normally a copolymer which is compatible with the polycarbonamide base resin, and which will completely wet the filler. In general, the carrier resin will be a copolymer of ethylene with a comonomer having up to six carbon atoms and containing at least one carbonyl grouping. More specifically, the carrier resin will comprise a copolymer of ethylene with a comonomer such as vinyl acetate, acrylic acid and alkyl esters thereof, methacrylic acids and alkyl esters thereof, fumaric acids and alkyl esters thereof, maleic anhydride, maleic acids and alkyl esters thereof, and the like. Normally, these copolymers will have a Melt Index of 0.1 to about 2000 and preferably of about 1.5 to 15.

The methods of preparing these copolymers are not critical, and they may be prepared by any various processes known in the art, typical of which are those found in patents such as U.S. 2,200,429, U.S. 2,395,381, U.S. 2,599,123, U.S. 2,703,794 and U.S. 2,953,551.

Particularly effective carrier resins within this invention are the copolymers of ethylene-acrylate esters and ethylenemethacrylate esters. In general, these copolymers will be formed by the copolymerization of ethylene with either an alkyl ester of acrylic acid or an alkyl ester of methacrylic acid, with the invention being described with particular reference to a copolymer of ethylene and methyl acrylate.

Specific esters suitable for the formation of the copolymer include such as the methyl, ethyl, propyl, isopropyl, butyl, isobutyl, hexyl, t-butyl, 2-ethylhexyl, decyl, lauryl and stearyl esters of the various acids. As will be obvious to those skilled in the art, the alkyl portion of the alkyl esters may also have, if desired, certain simple substituents which do not detract from or interfere with the desired properties of the base resin when incorporated therein.

These preferred ethylene-acrylate ester and ethylene-methacrylate ester copolymers are known in the art, and can be prepared by the processes of U.S. Pats. No. 2,200,492 and No. 2,953,551, as identified above. A particularly effective class of such copolymers is disclosed in British Pat. No. 900,969. These copolymers have a highly uniform distribution of the acrylate ester or methacrylate ester in the copolymer, and accordingly the teachings of this British patent are incorporated herein by reference thereto. Particularly effective of these copolymers are those formed by the polymerization of ethylene and methyl acrylate having from about 15 to about 40 percent, by weight of the copolymer, of the combined methyl acrylate, and with a Melt Index of about 2 to about 2,000. A particularly effective copolymer of ethylene and methyl acrylate is that having about 20 percent of the combined methyl acrylate and with a Melt Index of about 1.5 to 15.

Generally, the final product (base resin/copolymer carrier resin/filler) will, in accordance with this invention, contain, by weight of the final product, 45 to 99 percent of the polycarbonamide, 0.5 to 15 percent of the copolymer carrier resin, and from about 0.01 to 40 percent of the filler.

Normally, where the polycarbonamide is to be filled with pigment for coloring purposes, the foregoing broad ranges will be generally restricted for this purpose to 90–99 percent of the polycarbonamide, 0.5 to 10 percent of the copolymer carrier resin and 0.01 to 9.0 percent filler; and, conversely, for loading purposes (as with asbestos and glass fibers) the broad ranges for such application will normally be 30 to 90 percent polycarbonamide, 10 to 15 percent copolymer carrier resin and 10 to 60 percent filler.

Preferably, this final product will comprise 75 to 99 percent of the polcarbonamide, 0.5 to 5 percent of the carrier resin, and 0.02 to 20 percent of the filler.

Again, where the resins are to be filled with pigment for coloring purposes, the preferred ranges are 0.02 to 4.0 percent filler, 95 to 99 percent polycarbonamide resin, and 0.8 to 4.8 percent copolymer resin; and where the filler is employed for loading of the risin (as with asbestos and glass fibers), the preferred ranges are 65 to 90 percent polycarbonamide, 0.5 to 5.0 percent copolymer carrier resin and 5 to 40 percent filler.

In practice, and in accordance with preparation of the improved polyamide resins of this invention, it is essential that the carrier resin, lactam and the filler are blended together before incorporation of the filler into the polycarbonamide resin. In this respect, the lactam, carrier resin and filler can be mechanically mixed together by conventional techniques, such as mill mixing, Banburying or mixing screws, to form a master batch or concentrate having a highly uniform dispersion or distribution of the filler therein. The concenatrte can then be forced through an extruder and cut or subdivided into pellet form of any desired size.

The lactam employed in preparation of the master batch or concentrate is a cyclic amide produced by the removal of a molecule of water from an amino acid such as 6-aminocaproic acid, 9-aminonoanoic acid, and 11-aminoundecanoic acid. Epsiloncaprolactam is a preferred lactam.

As will be readily seen, the weight ratio of carrier resin to filler in the master batch or concentrate is necessarily dictated by the desired proportion of components in the final product of this invention. For example, if the final product is to contain equal amounts of the carrier resin and the filler, the concentrate or master batch will be formed wiht equal amounts of the carrier resin and the filler contained therein. The concentration of lactam in the concentrate or master batch can vary widely as the lactam employed in preparation of the conecentrate can be subsequently removed from the final product of the invention by a water washing step at an elevated temperature.

Generally, the concentrate will be prepared to contain 15 to 60 percent, by weight, of the lactam, 15 to 60 percent, by weight, of the carrier resin, and 25 to 70 percent, by weight, of the filler. Although not to be limited thereto, it has been observed that concentrates or master batches containing equal portions of lactam, carrier resin and carbon black have been found to be effective in dispersing carbon black throughout the polycarbonamide resin and producing a final product having increased tensile strength and elongation.

In the preparation of the concentrate or master batch of this invention, the lactam, carrier resin and filler can be introduced independently into the mixing zone and as heretofore noted, mechanically mixed together by conventional techniques to form a master batch or concentrate having a highly uniform dispersion or distribution of the filler therein. Preferably, the lactam is blended with the filler prior to combining the filler and lactam combination with the carrier resin in preparation of the concentrate. This preblending of the lactam and filler has been found to be particularly effective when incorporating carbon black into polycarbonamide resin. It is believed that the lactam penetrates into the carbon particles, completely wetting the carbon particles, and establishing an effective bond between the carrier resin and the carbon particles.

A major quantity of the concentrate or master batch (usually pelletized) can be added to a measured quantity of the polycarbonamide base resin (also usually pelletized) and the mixture suitably malaxated by conventional means to homogenize the mixture to the degree of uniformity required or desired. It is also within the scope of this invention to prepare a melt mixture of the concentrate or master batch and blend the melt mixture with a solid polycarbonamide base resin or a polycarbonamide base resin melt. As with the preparation of the concentrate, the homogenization of the concentrate/polycarbonamide mixture can be affected by conventional means such as mill mixing, Banburying and extruding. In such cases, as will be appreciated, the uniformity of the lactam/filler/carrier resin concentrate and of the concentrate/polycarbonamide mixture is affected by the shearing and elevated temperatures encountered during the mixing thereof by mill mixing, Banbury and extruding techniques.

If desired, the lactam present in the final concentrate/polycarbonamide blend can be separated and recovered from the blend by subjecting the blend to a water washing step at a temperature of about, for example, 200° F. The concentrate/polycarbonamide blend recovered from the water washing step is substantially free of the lactam employed in preparation of the concentrate.

The following examples are presented to illustrate the advantages and objects of the invention. It is not intended that the specific embodiments disclosed therein should limit the invention.

EXAMPLE 1

In this example a masterbatch or concentrate was prepared by mechanically mixing at a temperature of 240–260° F., in a Banbury, a mixture of 50 percent, by weight, of an ethylene-methyl acrylate copolymer (having 20 weight percent of combined methyl acrylate and a Melt Index of 2) and 50 weight percent of carbon black. The homogeneous mixture is then subdivided into the desired size by extrusion and pelletizing.

The concentrate is blended and compounded with Nylon 6 (condensation product of caprolactam) to obtain a finished product having the following composition:

| | Weight percent |
|---|---|
| Nylon 6 | 96.0 |
| Ethylene-methyl acrylate copolymer | 2.0 |
| Carbon black | 2.0 |

EXAMPLE 2

In this example a masterbatch or concentrate is prepared by mechanically mixing in a Banbury 33⅓ percent, by weight, of the ethylene-methyl acrylate copolymer of Example 1, 33⅓ percent, by weight, of caprolactam, and 33⅓ percent, by weight, of carbon black at a temperature of 240° F. to 260° F. The homogeneous mixture is then subdivided into the desired size by extrusion followed by pelletiizng.

The masterbatch is blended and compounded with the Nylon 6 of Example 1 to provide a composition as follows:

| | Weight percent |
|---|---|
| Nylon 6 | 94.0 |
| Caprolactam | 2.0 |
| Ethylene-methyl acrylate | 2.0 |
| Carbon black | 2.0 |

After extrusion the finished product is washed at a temperature of about 200° F. to remove the excess caprolactam. The finished material is then dried.

EXAMPLE 3

ASTM tensile specimens are prepared from the product resins of Example 1 (Run 1) and Example 2 (Run 2). The resin formulations were molded using the same conditions with only the injection pressure being varied as required to fill the mold. Table I shows the molding conditions employed.

TABLE I.—MOLDING CONDITIONS

| | Run 1 | Run 2 |
|---|---|---|
| Plunger forward, sec | 15 | 15 |
| Charge, sec | 1 | 1 |
| Dies cooling, sec | 20 | 20 |
| Ejection, sec | 4 | 4 |
| Injection pressure, p.s.i. | 1,400 | 925 |
| Mold temperature, °F | 180 | 180 |
| Nozzle, percent | 80 | 80 |
| Cylinder temperature, °F.: | | |
| Rear | 400 | 400 |
| Front | 400 | 400 |

Equipment.—Two ounce Van Dorn and single cavity ASTM D638 Type I tensile specimen mold.

Specimens molded from the resin of Example 2 have a smoother surface than the specimens molded from the resin of Example 1.

Tensile and impact properties are determined on the resin formulations of Examples 1 and 2. Izod impact specimens (ASTM D256-56) were obtained from the center section of the ASTM tensile specimens. The yield point, ultimate tensile strength, tensile strength at break and elongation of the specimens are determined in accordance with ASTM D638-61T. The rate of pull is two inches per minute. Prior to testing the specimens are conditioned in 65 percent relative humidity for 72 hours at 80° C. Under these conditions a moisture equilibrium of approximately 3.5 weight percent is obtained. Table II shows the physical properties of the resin formulations of Examples 1 and 2.

TABLE II.—PHYSICAL PROPERTIES

| Property (units) | Run 1 | Run 2 |
|---|---|---|
| Yield point (p.s.i.) | 5,900 | 5,500 |
| Ultimate tensile strength (p.s.i.) | 5,900 | 8,400 |
| Tensile strength at break (p.s.i.) | 5,500 | 8,200 |
| Elongation (percent) | 115 | 280 |
| Impact strength (izod) (ft. lbs./in. notch) | 5.29 | 11.14 |

From the above it is readily apparent that by the invention the ultimate tensile strength, tensile strength at break, elongation and impact strength of a polycarbonamide resin containing a filler (carbon black) is substantially improved.

Although the invention has been described with reference to specific materials, embodiments and details, various modifications and changes, within the scope of the invention, will be apparent to one skilled in the art and are contemplated to be embraced within the invention.

What is claimed is:

1. A method of dispersing a filler throughout a polycarbonamide resin which comprises malaxating a mixture of a concentrate and a polycarbonamide resin, said concentrate comprising a filler, a lactam in sufficient concentration to wet said filler, and a copolymer having a melt index in the range of 0.1 to 2,000 and consisting essentially of ethylene with a comonomer selected from the group consisting of vinyl acetate, alkyl esters of acrylic acid, alkyl esters of methacrylic acid, maleic anhydride, alkyl esters of fumaric acid and alkyl esters of maleic acid.

2. The method of claim 1 to include separating lactam from the resultant blend.

3. The process of claim 2 wherein said lactam is caprolactam, said polycarbonamide resin is a condensation product of caprolactam, and said filler is carbon black.

4. The process of claim 3 wherein caprolactam is separated from said resultant blend by water washing said blend at an elevated temperature.

5. A method which comprises blending a lactam with a filler to provide a homogeneous mixture of filler and lactam, and thereafter blending the resultant mixture with a carrier resin, said carrier resin comprising a copolymer having a melt index in the range of 0.1 to 2,000 and consisting essentially of ethylene with a comonomer selected from the group consisting of vinyl acetate, alkyl esters of acrylic acid, alkyl esters of methacrylic acid, maleic anhydride, alkyl esters of fumaric acid and alkyl esters of maleic acid, and thereafter blending the resulting mixture with a polyamide.

References Cited

UNITED STATES PATENTS 3,350,372   10/1967   Anspon et al. _____ 260—41

FOREIGN PATENTS 641,952   1/1964   Belgium.

ALLAN LIEBERMAN, Primary Examiner

U.S. Cl. X.R.

260—30.2, 37, 857